(12) United States Patent
Yeh et al.

(10) Patent No.: US 8,233,048 B2
(45) Date of Patent: Jul. 31, 2012

(54) METHOD FOR INDEXING A SPORTS VIDEO PROGRAM CARRIED BY A VIDEO STREAM

(75) Inventors: Chia-Hung Yeh, Tai-Nan (TW); Hsuan-Huei Shih, Taipei (TW)

(73) Assignee: MAVs Lab. Inc., Songshan Dist., Taipei (TW)

( * ) Notice: Subject to any disclaimer, the term of this patent is extended or adjusted under 35 U.S.C. 154(b) by 1716 days.

(21) Appl. No.: 11/533,357

(22) Filed: Sep. 19, 2006

(65) Prior Publication Data
US 2008/0068511 A1 Mar. 20, 2008

(51) Int. Cl.
*H04N 7/18* (2006.01)
(52) U.S. Cl. ............... 348/157; 375/240.01; 375/240.26
(58) Field of Classification Search ............ 375/240.01–240.29; 348/142–160
See application file for complete search history.

(56) References Cited

U.S. PATENT DOCUMENTS

| 6,100,941 A * | 8/2000 | Dimitrova et al. ............ 348/700 |
| 6,449,021 B1 | 9/2002 | Ohta |
| 7,372,991 B2 * | 5/2008 | Chen et al. .................... 382/173 |
| 2005/0089224 A1 | 4/2005 | Aoki |

FOREIGN PATENT DOCUMENTS

| CN | 1349351 A | 5/2002 |
| EP | 1 571 595 A2 | 9/2005 |
| WO | 2005076594 A1 | 8/2005 |

* cited by examiner

*Primary Examiner* — Andy Rao
(74) *Attorney, Agent, or Firm* — Winston Hsu; Scott Margo

(57) ABSTRACT

A method for indexing a sports video program carried by a video stream is disclosed. The method includes temporarily indexing a plurality of shots of the video stream by performing shot detection. In addition, the method further includes extracting a plurality of shots of the sports video program from at least one portion of the shots indexed during the shot detection at least according to low level visual features of the at least one portion, whereby the extracted shots are temporarily kept indexed. Additionally, the method further includes validating a plurality of shots by comparing one of the extracted shots with at least the others of the extracted shots, whereby the validated shots are kept indexed for use of playback of at least one portion of the sports video program.

19 Claims, 5 Drawing Sheets

|     | $F_1$ | $F_2$ | $\cdots$ | $F_N$ |
|-----|-------|-------|----------|-------|
| $F_1$ | $C_{1,1}$ | $C_{1,2}$ | $\cdots$ | $C_{1,N}$ |
| $F_2$ | $C_{2,1}$ | $C_{2,2}$ | $\cdots$ | $C_{2,N}$ |
| $\vdots$ | $\vdots$ | $\vdots$ | $\vdots$ | $\vdots$ |
| $F_N$ | $C_{N,1}$ | $C_{N,2}$ | $\cdots$ | $C_{N,N}$ |
| Sum | $S_1$ | $S_2$ | $\cdots$ | $S_N$ |

Fig. 3

METHOD FOR INDEXING A SPORTS VIDEO PROGRAM CARRIED BY A VIDEO STREAM

BACKGROUND OF THE INVENTION

1. Field of the Invention

The present invention relates to video processing, and more particularly, to a method for indexing a sports video program carried by a video stream.

2. Description of the Prior Art

In a sports video program, some segments or shots are especially interesting in contrast to the others, for example, the moment when a basketball player shoots a basket in a basketball game, or the moment when a batter attempts to hit a baseball with a bat in a baseball game. In order to produce a highlight version of the sports video program, one may spend a lot of time on video editing.

Although digital video editing application tools for being executed with a personal computer are available nowadays, it still takes efforts of the users who utilize the application tools to perform video editing manually since an application program of this kind typically provides a user interface for instructing the application program what to do (e.g., combining a plurality of segments cut and selected by the user) rather than providing an automatically editing function.

SUMMARY OF THE INVENTION

It is therefore an objective of the claimed invention to provide methods for indexing a sports video program carried by a video stream.

According to one embodiment of the claimed invention, a method for indexing a sports video program carried by a video stream is disclosed. The method comprises: temporarily indexing a plurality of shots of the video stream by performing shot detection; extracting a plurality of shots of the sports video program from at least one portion of the shots indexed during the shot detection at least according to low level visual features of the at least one portion, whereby the extracted shots are temporarily kept indexed; and validating a plurality of shots by comparing one of the extracted shots with at least the others of the extracted shots, whereby the validated shots are kept indexed for use of playback of at least one portion of the sports video program.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates detailed implementation of the validating step shown in FIG. 1 according to one embodiment of the present invention.

DETAILED DESCRIPTION

Figure 1:
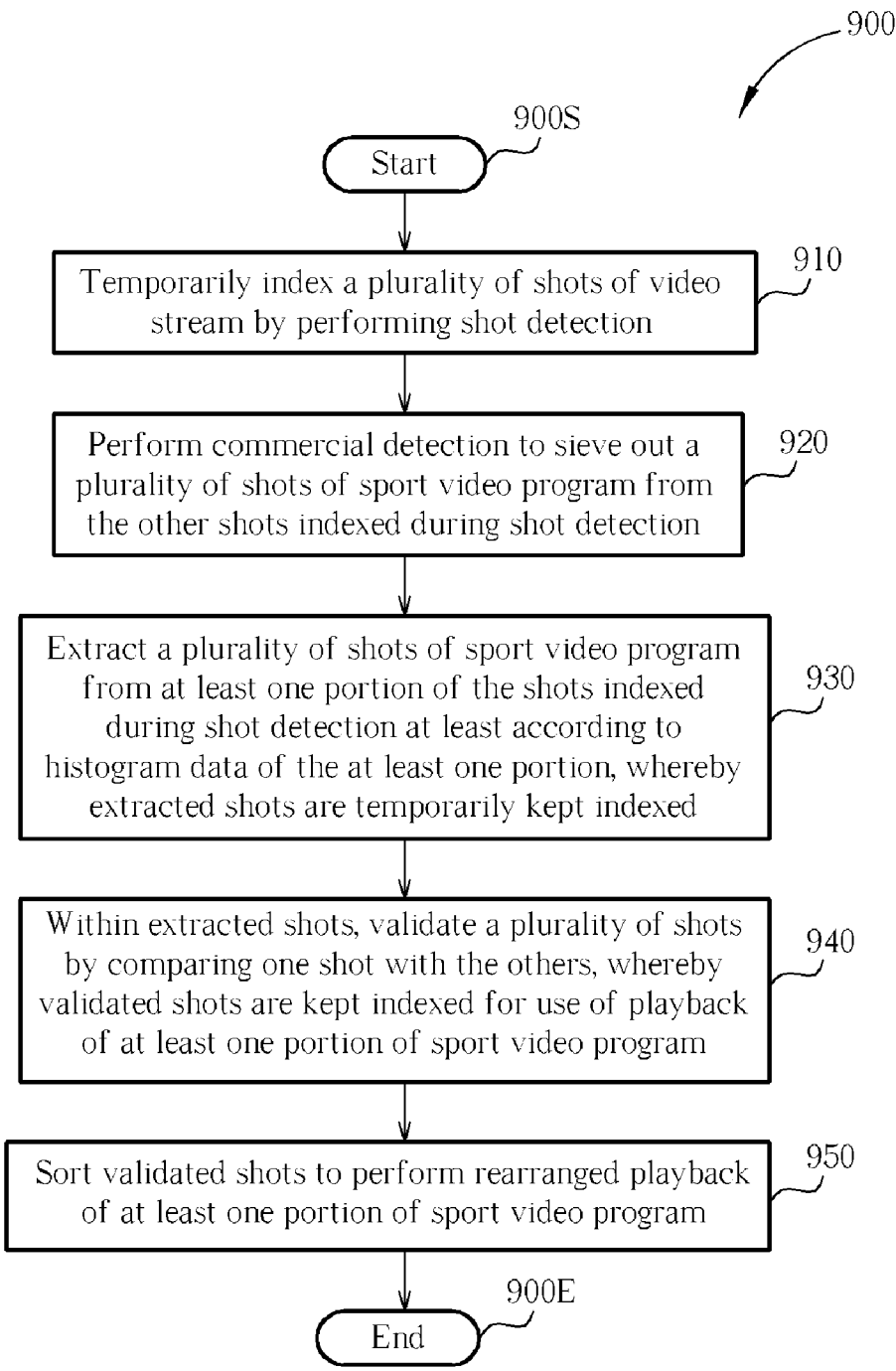
FIG. 1 is a flowchart of a method for indexing a sports video program carried by a video stream according to one embodiment of the present invention.
Figure 2:
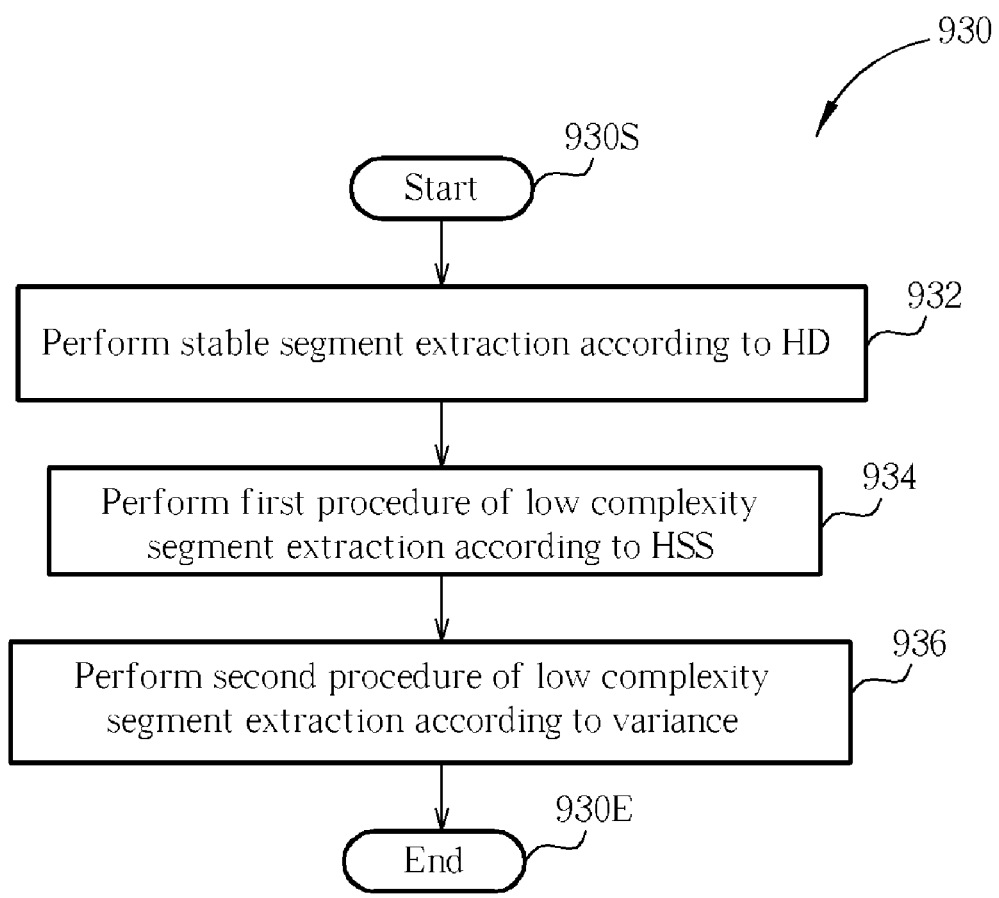
FIG. 2 is a flowchart of detailed implementation of the extracting step shown in FIG. 1 according to one embodiment of the present invention.

Please refer to FIG. 1 and FIG. 2. FIG. 1 illustrates a flowchart of a method 900 for indexing a sports video program carried by a video stream according to one embodiment of the present invention, where FIG. 2 is a flowchart of detailed implementation of step 930 shown in FIG. 1 according to this embodiment. By applying the method 900 to the video stream, the sports video program can be automatically indexed, where the number of indexed shots can be varied while the video data carried by the video stream is screened more than once. As a result, an objective of the present invention, for example, producing a highlight version of the sports video program automatically, can be achieved by utilizing the method 900.

In Step 910, temporarily index a plurality of shots of the video stream by performing shot detection. According to this embodiment, the shot detection is implemented by detecting shot changes, for example, detecting luminance differences between frames. In addition, a key frame can be selected from a plurality of frames within each shot to represent the shot, for example, the first frame of each shot can be selected as the key frame of the shot. As the shot detection technology is well known in the art, implementation of Step 910 is not explained in detail. Here, the shots that are temporarily indexed in Step 910 are considered to be the candidate shots for the coming step(s).

In Step 920, perform commercial detection to sieve out a plurality of shots of the sports video program from the other shots indexed during the shot detection performed in Step 910. As a result of performing the commercial detection, the commercial contents carried by the video stream are filtered out. According to the present invention, Step 920 is optional in some cases, especially the case that no commercial content exists in the video stream. The commercial detection performed in Step 920 can be implemented by utilizing the commercial detection technology known in the art, and therefore not explained in detail here. Here, the sieved shots that are temporarily kept indexed are considered to be the candidate shots for the next step, which is Step 930 according to this embodiment.

In Step 930, extract a plurality of shots of the sports video program from at least one portion of the shots indexed during the shot detection at least according to low level visual features of the at least one portion for example, histogram data of the at least one portion, whereby the extracted shots are temporarily kept indexed. According to different implementation choices of this embodiment, the low level visual features can be the histogram data of color histograms or luminance histograms. According to different embodiments of the present invention, the low level visual features can be pixel difference comparison results of the at least one portion or discrete cosine transform (DCT) coefficients of the at least one portion.

According to the embodiment shown in FIG. 1, as the commercial detection is performed, the at least one portion of the shots indexed during the shot detection is defined as the sieved shots here. In this embodiment, Step 930 comprises detailed steps such as Steps 932, 934, and 936 for performing stable segment extraction and low complexity segment extraction, as shown in FIG. 2.

In Step 932, the stable segment extraction is performed according to histogram differences (HDs). According to this embodiment, the stable segment extraction is performed by first summing a plurality of HDs within each shot to generate a histogram difference sum of the shot, where each of the plurality of HDs corresponds to the difference between two histograms of two frames within the shot. Then, the stable segment extraction is completed by excluding the shots that have larger histogram difference sums than the others from being extracted. That is, in this embodiment, the shots that have smaller histogram difference sums are considered to be stable, and therefore, extracted in Step 932. The extracted shots are temporarily kept indexed, while the excluded shots can be omitted. Here, the extracted shots that are temporarily kept indexed are considered to be the candidate shots for the next step, which is Step 934 according to this embodiment.

According to one implementation choice of this embodiment, whether a histogram difference sum is considered to be smaller or larger in step 932 can be determined by utilizing a predetermined threshold. According to another implementation choice of this embodiment, whether a histogram difference sum is considered to be smaller or larger in step 932 can be determined by utilizing a predetermined percentage with respect to ranking of the histogram difference sums.

In Step 934, the low complexity segment extraction is performed according to histogram square sums (HSSs). According to this embodiment, a first procedure of the low complexity segment extraction is performed by first summing a plurality of histogram square values of a key frame of each of the shots except the shots that have larger histogram difference sums than the others to generate a HSS of the key frame. That is, for each of the shots extracted in Step 932, the corresponding HHS is calculated. Then, the first procedure of the low complexity segment extraction is completed by excluding the shots whose key frames have smaller HSSs than the others from being extracted. That is, in this embodiment, the shots whose key frames have larger HSSs are considered to have low complexity, and therefore, extracted in Step 934. The extracted shots are temporarily kept indexed, while the excluded shots can be omitted. Here, the extracted shots that are temporarily kept indexed are considered to be the candidate shots for the next step, which is Step 936 according to this embodiment.

According to one implementation choice of this embodiment, whether an HSS is considered to be smaller or larger in step 934 can be determined by utilizing a predetermined threshold. According to another implementation choice of this embodiment, whether an HSS is considered to be smaller or larger in step 934 can be determined by utilizing a predetermined percentage with respect to ranking of the HSSs.

In Step 936, the low complexity segment extraction is further performed according to the variances of key frames of the shots extracted in Step 934. According to this embodiment, a second procedure of the low complexity segment extraction is performed by first calculating the variance of the key frame of each of the shots except the shots whose key frames have smaller HSSs than the others. Then, the second procedure of the low complexity segment extraction is completed by excluding the shots whose key frames have larger variances than the others from being extracted. That is, in this embodiment, the shots whose key frames have smaller variances are considered to have low complexity, and therefore, extracted in Step 936. The extracted shots are temporarily kept indexed, while the excluded shots can be omitted. Here, the extracted shots that are temporarily kept indexed are considered to be the candidate shots for the next step, which is Step 940 according to this embodiment.

According to one implementation choice of this embodiment, whether a variance is considered to be smaller or larger in step 936 can be determined by utilizing a predetermined threshold. According to another implementation choice of this embodiment, whether a variance is considered to be smaller or larger in step 936 can be determined by utilizing a predetermined percentage with respect to ranking of the variances. According to this embodiment, the shots extracted in Step 936 shown in FIG. 2 are considered to be the shots extracted in Step 930 shown in FIG. 1.

In Step 940, within the shots extracted in Step 930 (i.e. the candidate shots for Step 940 mentioned above), validate a plurality of shots by comparing one shot with the others, whereby the validated shots are kept indexed for use of playback of at least one portion of the sports video program. In particular, the validated shots mentioned above are kept indexed for use of rearranged playback of the at least one portion of the sports video program, for example, the validated shots can be played back in a rearranged order by sorting the validated shots in the coming step(s).

According to this embodiment, comparing one shot (i.e., one of the candidate shots for Step 940) with the others can be implemented by first selecting a most significant shot within the shots extracted in Step 930, and then validating the plurality of shots according to comparison results of the most significant shot and the other extracted shots. For example, the most significant shot can be the shot whose key frame has least HD sum with respect to the other shots' key frames.

It is noted that the key frame of each shot can be selected in Step 910. In addition, the HD corresponding to the difference between the histogram of the key frame of the most significant shot and the histogram of the key frame of one of the other shots within the shots extracted in Step 930 can be derived according to the histogram data that is utilized in Step 930, especially Step 932. As a result, selecting the most significant shot from the shots extracted in Step 930 does not take a lot of efforts since the histogram data is ready for use in step 940.

In addition, after the most significant shot is selected, the HDs corresponding to the differences between the histogram of the key frame of the most significant shot and the histograms of the key frames of the other shots within the shots extracted in Step 930 are also ready for comparison of one another. As a result of comparing the HDs calculated in Step 940, within the shots extracted in Step 930, the shots corresponding to smaller HDs are then validated to be the validated shots mentioned above. The validated shots are kept indexed, while the other shots that correspond to larger HDs can be omitted.

According to one implementation choice of this embodiment, whether an HD is considered to be smaller or larger in step 940 can be determined by utilizing a predetermined threshold. According to another implementation choice of this embodiment, whether an HD is considered to be smaller or larger in step 940 can be determined by utilizing a predetermined percentage with respect to ranking of the HDs.

In Step 950, sort the validated shots that are kept indexed to perform the rearranged playback of the at least one portion of the sports video program. According to this embodiment, the validated shots are sorted by comparing motions of the validated shots from Step 940. In particular, the validated shots are sorted by variation of the motions.

According to the present invention, Step 950 can be executed more than once according to different sorting requirements of different times, for example, according to various predetermined parameters or various requirements instructed by the user, in order to perform rearranged playback of at least one portion of the sports video program in different order.

According to a variation of this embodiment, the validated shots can be sorted by similarity.

According to another variation of this embodiment, if it is sure that there is no commercial segment or shot in the video stream, Step 920 can be omitted. According to this variation, in Step 930, the at least one portion of the shots indexed during the shot detection substantially comprises all the shots indexed during the shot detection performed in Step 910.

According to another embodiment of the present invention, the method 900 can be applied to the video stream more than once.

Please refer to FIG. 3. FIG. 3 illustrates detailed implementation of the validating performed in Step 940 shown in FIG. 1 according to one embodiment of the present invention. Applying the detailed implementation shown in FIG. 3 to the embodiment shown in FIG. 1, Step 940 is further explained as follows.

The frames $F_1, F_2, \ldots,$ and $F_N$ shown in FIG. 3 respectively represent the key frames of the candidate shots for Step 940.

According to this embodiment, the comparison result $C_{i,j}$ (i=1, 2, ..., N; j=1, 2, ..., N) shown in FIG. 3 represents the HD between the frame F and the frame $F_j$, where if i=j, the comparison result $C_{i,j}$ is equal to zero. The sums $S_1, S_2, ..., $ and $S_N$ represent the sums of the comparison results within the corresponding columns of the table shown in FIG. 3, respectively. That is, $S_k=C_{1,k}+C_{2,k}+...+C_{N,k}$ (k=1, 2, ..., N). Within the sums $S_1, S_2, ..., $ and $S_N$, the smallest one, for example, $S_{k0}$, is then identified. As a result, the shot whose key frame is frame $F_{k0}$ is selected as the most significant shot.

According to this embodiment, either the $k0^{th}$ column of comparison results (i.e., $C_{1,k0}, C_{2,k0}, ..., $ and $C_{N,k0}$) or the $k0^{th}$ row of comparison results (i.e., $C_{k0,1}, C_{k0,2}, ..., $ and $C_{k0,N}$) can be utilized for validating the candidate shots. For example, the $k0^{th}$ column of comparison results are utilized for validating the candidate shots. The smaller ones of the comparison results (i.e., the $k0^{th}$ column of comparison results in this embodiment) can be identified by comparing these comparison results with the predetermined threshold mentioned above. As a result, within the candidate shots for Step 940, the shots corresponding to smaller comparison results (i.e., smaller HDs in this embodiment) are validated since they are considered to be similar to the most significant shot.

According to another embodiment, which is a variation of the embodiment shown in FIG. 1, Step 940 can be replaced with Step 940' as follows:

Step 940': validate a plurality of shots by comparing one of the extracted shots with at least the others of the extracted shots, whereby the validated shots are kept indexed for use of playback of at least one portion of the sports video program.

In this variation, comparing one of the extracted shots with at least the others of the extracted shots can be implemented by first selecting the most significant shot within the shots extracted in Step 930 as mentioned in the embodiment shown in FIG. 1, and then validating the at least one portion of the shots indexed during the shot detection (which is performed in Step 910) according to comparison results of the most significant shot and the at least one portion of the shots indexed during the shot detection. According to this variation, the at least one portion of the shots indexed during the shot detection is defined as the sieved shots mentioned above, i.e. the candidate shots for Step 930 in the embodiment shown in FIG. 1. Similar descriptions of this variation are not repeated in detail here.

According to another embodiment, which is another variation of the embodiment shown in FIG. 1, Step 940 is replaced with Step 940' mentioned above, where comparing one of the extracted shots with at least the others of the extracted shots is implemented by first selecting the most significant shot within the shots extracted in Step 930 as mentioned in the embodiment shown in FIG. 1, and then validating all the shots indexed during the shot detection according to comparison results of the most significant shot and all the shots indexed during the shot detection. Similar descriptions of this variation are not repeated in detail here.

Figure 4:
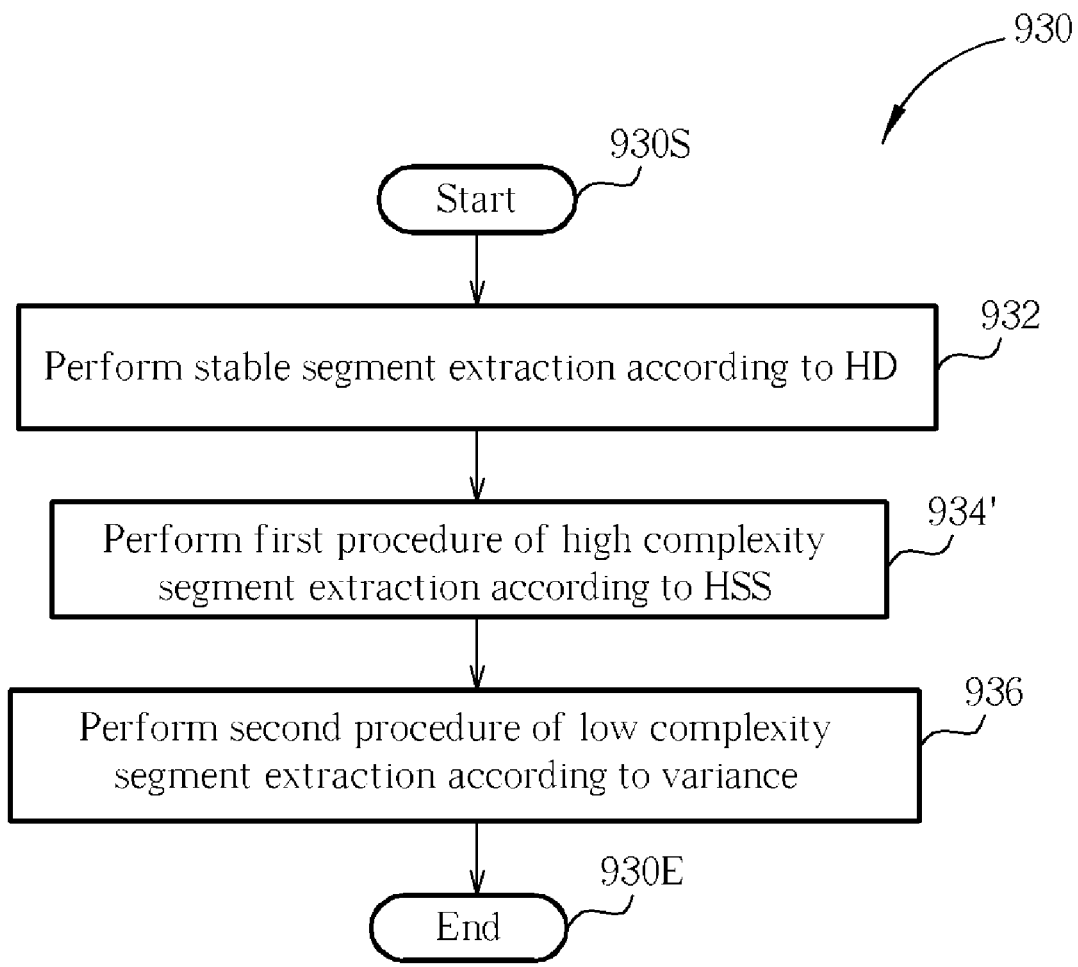
FIG. 4 is a flowchart of detailed implementation of the extracting step shown in FIG. 1 according to one embodiment of the present invention.

According to the present invention, the implementation of Step 930 can be varied according characteristics of different kinds of sports video programs. Please refer to FIG. 4. FIG. 4 is a flowchart of detailed implementation of Step 930 shown in FIG. 1 according to one embodiment of the present invention, where this embodiment is a variation of the embodiment shown in FIG. 2. In this variation, Step 934 shown in FIG. 2 is replaced with Step 934', which performs high complexity segment extraction according to HSSs. According to this variation, a first procedure of the high complexity segment extraction is performed by first summing the plurality of histogram square values of the key frame of each of the shots except the shots that have larger histogram difference sums than the others to generate the HSS of the key frame, as mentioned above. However, the first procedure of the high complexity segment extraction is then completed by excluding the shots whose key frames have larger HSSs than the others from being extracted. That is, in this embodiment, the shots whose key frames have smaller HSSs are considered to have high complexity, and therefore, extracted in Step 934'. Here, the extracted shots that are temporarily kept indexed are considered to be the candidate shots for the next step, which is Step 936 according to this variation.

Figure 5:
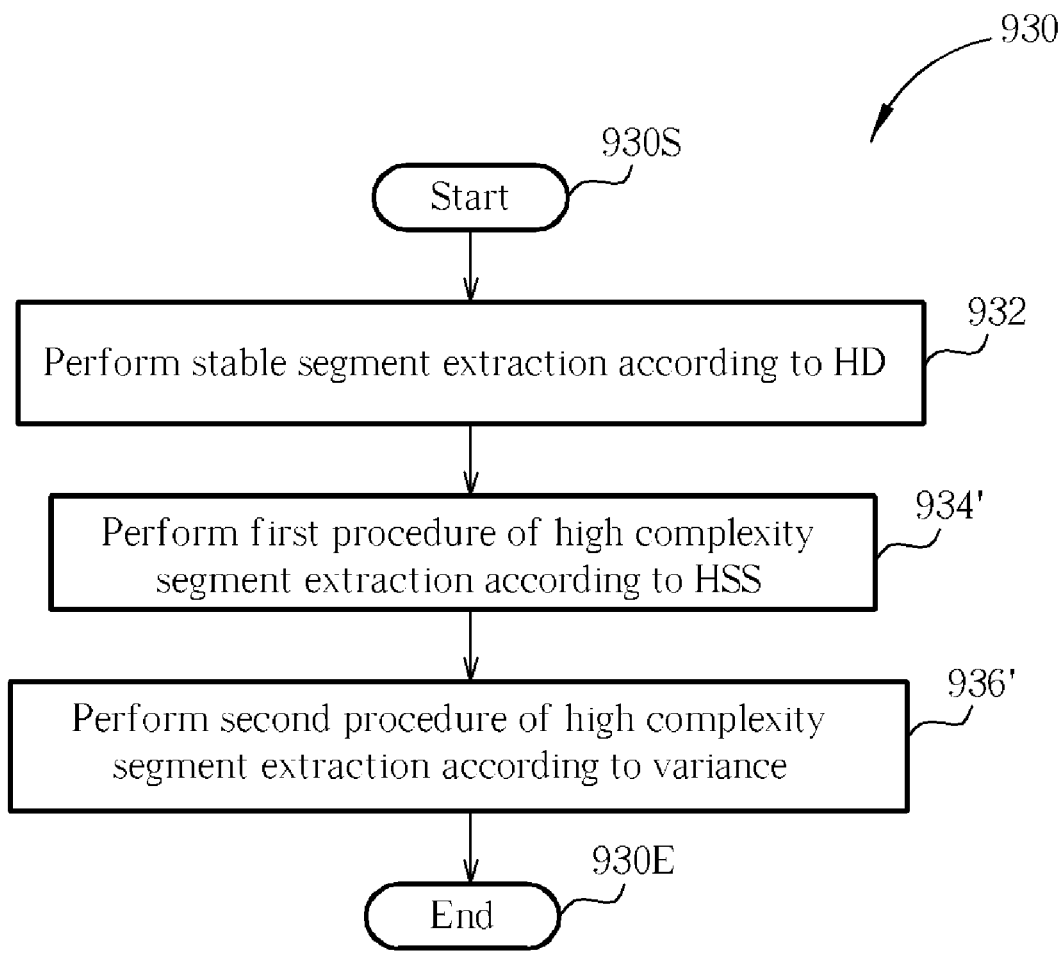
FIG. 5 is a flowchart of detailed implementation of the extracting step shown in FIG. 1 according to one embodiment of the present invention.

FIG. 5 is a flowchart of detailed implementation of Step 930 shown in FIG. 1 according to one embodiment of the present invention, where this embodiment is a variation of the embodiment shown in FIG. 2. In this variation, Step 934 and 936 shown in FIG. 2 are respectively replaced with Step 934' (which is disclosed in FIG. 4) and Step 936', where Step 936' performs a second procedure of the high complexity segment extraction according to the variances of the key frames of the shots extracted in Step 934'. According to this variation, the second procedure of the high complexity segment extraction is performed by first calculating the variance of the key frame of each of the shots except the shots whose key frames have larger HSSs than the others. Then, the second procedure of the high complexity segment extraction is completed by excluding the shots whose key frames have smaller variances than the others from being extracted. That is, in this embodiment, the shots whose key frames have larger variances are considered to have high complexity, and therefore, extracted in Step 936'. Here, the extracted shots that are temporarily kept indexed are considered to be the candidate shots for the next step, which is Step 940 according to this variation.

According to a variation of the embodiment shown in FIG. 2, Step 936 is replaced with Step 936' mentioned above while Step 934 is kept unvaried as shown in FIG. 2, where the operations of Step 936' are explained in the embodiment shown in FIG. 5. Similar descriptions of this variation are therefore not repeated in detail here.

According to another embodiment, which is a variation of the embodiment shown in FIG. 1, a genre determination step, for example, Step 905, can be inserted between Step 900S and Step 910 shown in FIG. 1, where Step 905 can be described as follows:

Step 905: determine the video genre of the sports video program.

According to one implementation choice of this embodiment, Step 905 is implemented by performing genre detection of the sports video program to derive the video genre. According to another implementation choice of this embodiment, Step 905 is implemented by retrieving the video genre via the internet from a service provider of the sports video program. According to another implementation choice of this embodiment, Step 905 is implemented by retrieving the video genre from an electronic program guide (EPG) of the sports video program. Yet according to another implementation choice of this embodiment, Step 905 is implemented by retrieving a user's decision via a user interface (e.g. the user interface of a video playback device for implementing the present invention methods) to determine the video genre.

As a result of applying Step 905 to this embodiment, the implementation of Step 930 can be varied according to the video genre determined in Step 905. For example, Step 930 can be implemented by selecting one of various working flows such as those shown in FIG. 2, FIG. 4, and FIG. 5, respectively.

In contrast to the prior art, the present invention methods can be utilized for automatically editing the sports video program. By utilizing a hardware device or software program (e.g. an application tool) that are implemented with the present invention, it does not take efforts of a user (e.g., a sports reporter or a sports fan) on preparation of a highlight version of the sports video program.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for indexing a sports video program carried by a video stream, comprising:
   temporarily indexing a plurality of shots of the video stream by performing shot detection;
   extracting a plurality of shots of the sports video program from at least one portion of the shots indexed during the shot detection at least according to low level visual features of the at least one portion, whereby the extracted shots are temporarily kept indexed; and
   validating a plurality of shots by comparing one of the extracted shots with at least the others of the extracted shots, whereby the validated shots are kept indexed for use of playback of at least one portion of the sports video program.

2. The method of claim 1, further comprising:
   performing commercial detection to sieve out a plurality of shots of the sports video program from the other shots indexed during the shot detection;
   wherein in the step of extracting the plurality of shots of the sports video program, the at least one portion of the shots indexed during the shot detection is defined as the sieved shots.

3. The method of claim 1, wherein the validated shots are kept indexed for use of rearranged playback of the at least one portion of the sports video program.

4. The method of claim 3, further comprising:
   sorting the validated shots that are kept indexed to perform the rearranged playback of the at least one portion of the sports video program.

5. The method of claim 4, wherein the step of sorting the validated shots further comprises:
   sorting the validated shots by comparing motions of the validated shots.

6. The method of claim 5, wherein the validated shots are sorted by similarity.

7. The method of claim 5, wherein the validated shots are sorted by variation of the motions.

8. The method of claim 1, wherein the low level visual features of the at least one portion comprise histogram data of the at least one portion.

9. The method of claim 8, wherein the step of extracting the plurality of shots of the sports video program further comprises:
   summing a plurality of histogram differences (HDs) within each shot to generate a histogram difference sum of the shot, wherein each of the plurality of HDs corresponds to the difference between two histograms of two frames within the shot; and
   excluding at least the shots that have larger histogram difference sums than the others from being extracted.

10. The method of claim 9, wherein the step of extracting the plurality of shots of the sports video program further comprises:
    summing a plurality of histogram square values of a key frame of each of the shots except the shots that have larger histogram difference sums than the others to generate a histogram square sum (HSS) of the key frame; and
    excluding at least the shots whose key frames have larger HSSs than the others from being extracted.

11. The method of claim 10, wherein the step of extracting the plurality of shots of the sports video program further comprises:
    calculating the variance of a key frame of each of the shots except the shots whose key frames have larger HSSs than the others; and
    excluding the shots whose key frames have larger variances than the others from being extracted.

12. The method of claim 8, wherein the low level visual features comprise the histogram data of color histograms or luminance histograms.

13. The method of claim 1, wherein the low level visual features of the at least one portion comprise pixel difference comparison results of the at least one portion.

14. The method of claim 1, wherein the low level visual features of the at least one portion comprise discrete cosine transform (DCT) coefficients of the at least one portion.

15. The method of claim 1, wherein a key frame is selected from a plurality of frames within each shot to represent the shot.

16. The method of claim 1, wherein the step of validating the plurality of shots by comparing one of the extracted shots with at least the others of the extracted shots further comprises:
    selecting a most significant shot within the extracted shots; and
    validating the plurality of shots according to comparison results of the most significant shot and the other extracted shots.

17. The method of claim 1, wherein the step of validating the plurality of shots by comparing one of the extracted shots with at least the others of the extracted shots further comprises:
    selecting a most significant shot within the extracted shots; and
    validating the at least one portion of the shots indexed during the shot detection according to comparison results of the most significant shot and the at least one portion of the shots indexed during the shot detection.

18. The method of claim 1, wherein the step of validating the plurality of shots by comparing one of the extracted shots with at least the others of the extracted shots further comprises:
    selecting a most significant shot within the extracted shots; and
    validating all the shots indexed during the shot detection according to comparison results of the most significant shot and all the shots indexed during the shot detection.

19. The method of claim 1, further comprising:
    determining the video genre of the sports video program;
    wherein the step of extracting the plurality of shots of the sports video program from the at least one portion of the shots indexed during the shot detection further comprises:
    extracting the plurality of shots of the sports video program from the at least one portion of the shots indexed during the shot detection according to the video genre.

* * * * *